United States Patent
Li et al.

(10) Patent No.: US 9,751,145 B2
(45) Date of Patent: Sep. 5, 2017

(54) SEALING DEVICE FOR SLOT-TYPE VACUUM GLASS

(75) Inventors: Yanbing Li, Henan (CN); Zhangsheng Wang, Henan (CN)

(73) Assignee: LUOYANG LANDGLASS TECHNOLOGY CO., LTD, Henan (CN)

( * ) Notice: Subject to any disclaimer, the term of this patent is extended or adjusted under 35 U.S.C. 154(b) by 410 days.

(21) Appl. No.: 13/989,045

(22) PCT Filed: Dec. 22, 2010

(86) PCT No.: PCT/CN2010/080113
§ 371 (c)(1),
(2), (4) Date: Jun. 21, 2013

(87) PCT Pub. No.: WO2012/068760
PCT Pub. Date: May 31, 2012

(65) Prior Publication Data
US 2014/0048530 A1 Feb. 20, 2014

(30) Foreign Application Priority Data

Nov. 23, 2010 (CN) .......................... 2010 1 0555368

(51) Int. Cl.
*B23K 13/01* (2006.01)
*B23K 1/002* (2006.01)
(Continued)

(52) U.S. Cl.
CPC .............. *B23K 1/002* (2013.01); *C03C 27/08* (2013.01); *E06B 3/6612* (2013.01);
(Continued)

(58) Field of Classification Search
CPC ....... B23K 1/002; C03C 27/08; E06B 3/6612; E06B 3/66357; E06B 3/67334; E06B 3/67365; Y02B 80/24
(Continued)

(56) References Cited

U.S. PATENT DOCUMENTS 2,575,251 A * 11/1951 Arnold ........................ 156/274.6
2,714,785 A    8/1955 Roovers
(Continued)

FOREIGN PATENT DOCUMENTS

CN           1618746 A        5/2005
JP           61127647    *    6/1986
(Continued)

*Primary Examiner* — Dana Ross
*Assistant Examiner* — Joseph Iskra
(74) *Attorney, Agent, or Firm* — AKC Patents, LLC; Aliki K. Collins

(57) ABSTRACT

A sealing device for slot-type vacuum glass is provided with a slot (11) through which a glass sheet to be sealed passes, inductive heating coils (14) are arranged around the slot, and the circumference of the glass sheet to be sealed is gradually hermetically sealed through metal brazing process as the glass sheet to be sealed passes through the slot via conveyor rollers (13). The device is further provided with a casing (10-1) and press wheels or rollers (15), and the slot extends through the casing, the inductive heating coils are arranged inside the casing around the slot, the press wheels or rollers (15) are set in the casing. The device is only required to be arranged in the middle of conveyor rollers in order to ensure that the glass sheet can pass through the slot, thereby simplifying equipment and sealing process, enhancing sealing efficiency.

4 Claims, 4 Drawing Sheets

(51) Int. Cl.
*E06B 3/66* (2006.01)
*E06B 3/663* (2006.01)
*E06B 3/673* (2006.01)
*C03C 27/08* (2006.01)

(52) U.S. Cl.
CPC ...... *E06B 3/66357* (2013.01); *E06B 3/67334* (2013.01); *E06B 3/67365* (2013.01); *Y02B 80/24* (2013.01)

(58) Field of Classification Search
USPC ...... 228/121, 122.1; 65/36, 41, 42, 43, 60.1, 65/60.4; 219/615, 653
See application file for complete search history.

(56) References Cited

U.S. PATENT DOCUMENTS

| | | | |
|---|---|---|---|
| 3,947,311 A * | 3/1976 | Jarchow | E06B 3/67343 156/107 |
| 4,142,881 A | 3/1979 | Louis | |
| 4,564,540 A | 1/1986 | Davies et al. | |
| 7,204,102 B1 | 4/2007 | Eames et al. | |
| 2010/0276473 A1* | 11/2010 | Hagen et al. | 228/121 |

FOREIGN PATENT DOCUMENTS

| | | | |
|---|---|---|---|
| JP | 10236852 | * | 9/1998 |
| JP | 11268934 | * | 10/1999 |
| JP | 2001270745 | * | 10/2001 |

* cited by examiner

SEALING DEVICE FOR SLOT-TYPE VACUUM GLASS

TECHNICAL FIELD

The invention relates to a sealing device for a slot-type vacuum glass, which is characterized in that two or a plurality of glass sheets forming vacuum glass are compounded together and then pass through a slot of the sealing device to complete the hermetical sealing of the circumference of the vacuum glass.

BACKGROUND ARTS

Vacuum glass formed by compounding two or a plurality of glass sheets gains increasing attention owing to excellent sound proof and heat insulating performance thereof. Hence, various methods for manufacturing vacuum glass and corresponding vacuum glass products have come up with successively. After years of research and a large number of experiments, the present applicant has invented a glass sheet compound sealing technology and a vacuum glass product processed based on the technology, and filed a patent application to China's State Intellectual Property Office. In the glass sheet compound sealing technology provided by the present applicant, metal brazing process is adopted for the hermetical sealing of the circumference of the glass sheet, and prior to the sealing, a metal layer which is fixedly bonded with the glass sheet is prefabricated on the circumferential surface of the glass sheet, two or a plurality of glass sheets are then compounded and, after the compound, the metal layers, corresponding to each other, on two adjacent glass sheets are connected each other in a manner of hermetical welding. During the welding, both the direct welded connection and the arrangement of a metal sealing piece between the two metal layers are workable, and the metal sealing piece is respectively in welding connection with the two metal layers to achieve the hermetical sealing of the edges of the glass sheet.

The previously invented vacuum glass of the present applicant is structurally shown as FIGS. 1, 2 and 3. In the Figures, 1 represents an upper layer glass sheet, 3 represents a lower layer glass sheet, 2 represents an intermediate spacer, and 4 represents a metal layer which is fabricated on and fixedly bonded with the glass sheet. In the vacuum glass shown as FIG. 1, the metal layers 4 on the upper and lower layer glass sheets are in direct brazing connection with each other. In FIG. 2, the upper and lower layer glass sheets are sealed through a metal sealing piece 5 with the U-shaped section, and the metal sealing piece 5 is in brazing connection with the two metal layers 4. What is different in the vacuum glass shown as FIG. 3 from the vacuum glass shown as FIGS. 1 and 2 is that, the glass sheet is provided in advance with a suction port 6, thus the fabricating sequence is to seal the circumference of the glass sheet at first, then vacuumize via the suction port 6 and close the suction port 6 after the predetermined vacuum degree is reached.

When the vacuum glass is fabricated, shown as the FIG. 4, the present applicant completed the brazing welding of the circumference of the glass sheet in a manner of moving a heating head along a portion to be sealed at the circumference of the glass sheet. Since positioning the glass sheet was required in fabricating every piece of vacuum glass and the heating head was required to travel around the circumference of the glass sheet once, the sealing efficiency of the vacuum glass was quite low and scale production of the vacuum glass was restricted.

Technical Solutions

With respect to the problems present in the prior art, the present invention aims at providing a slot-type vacuum glass sealing device with simple structure and high sealing efficiency.

In order to achieve the above aims, the slot-type vacuum glass sealing device according to the present invention is an inductive heating device, which is provided with a slot, through which, a glass sheet to be sealed passes, inductive heating coils are arranged around the slot, and the circumference of the glass sheet to be sealed is gradually hermetically sealed through metal brazing process as the glass sheet to be sealed passes through the slot; the glass sheet to be sealed comprises two or a plurality of mutually compounded glass sheets, the circumference of the glass sheet is provided with a metal layer which is fixedly bonded therewith; the hermetical sealing means that the metal layers, corresponding to each other, at the circumferences of two adjacent glass sheets are directly interconnected in a manner of hermetical welding, or a metal sealing piece is arranged between the metal layers, corresponding to each other, at the circumferences of two adjacent glass sheets, and the metal sealing piece is respectively connected with the metal layers on the two glass sheets in a manner of hermetical welding.

Further, the slot-type vacuum glass sealing device is further provided with a casing, the slot extends through the casing and the inductive heating coils are arranged inside the casing around the slot.

Further, the inductive heating coils are high frequency inductive coils.

Further, press rollers or press wheels are further arranged inside the slot, and by taking advantage of the press rollers or press wheels, the glass sheets pass through the slot under the state of mutual compression in order to guarantee that the circumferences of the glass sheets are in reliable welding connection.

Previously, in order to enable a heating head to move along the circumference of the glass sheet, a corresponding movement mechanism was required, furthermore, the initial position of the heating head in relation to the glass sheet needs to be readjusted prior to every sealing of the glass sheet, which not only leads to equipment structural complexity and increased processing cost of the vacuum glass, but also results in inferior processing efficiency. However, in case that the sealing device according to the present invention is used for sealing the circumference of the glass sheet, the device is only required to be arranged in the middle of glass conveyor rollers in order to ensure that the glass sheet can pass through the slot on the device, thereby simplifying equipment and sealing process, enhancing sealing efficiency and technically guaranteeing high-efficiency production of the vacuum glass.

DETAILED DESCRIPTION

Figure 5:
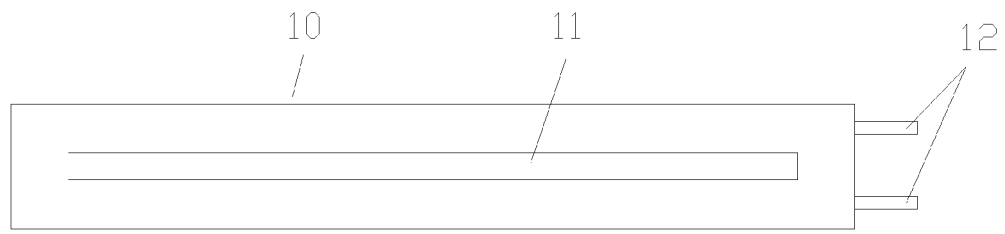
FIG. 5 is a schematic diagram of the structure of the sealing device according to the present invention.

Shown as FIG. 5, the slot-type vacuum glass sealing device 10 according to the invention is an inductive heating device, which is in a shape of elongated strip on the whole and is provided with a casing, at the middle part of the casing along its height is provided with a slot 11 extending along the length of the casing, inductive heating coils are arranged around the slot 11 inside the casing in a conventional manner, and joints of the inductive heating coil are arranged at one end of the casing.

Figure 6:
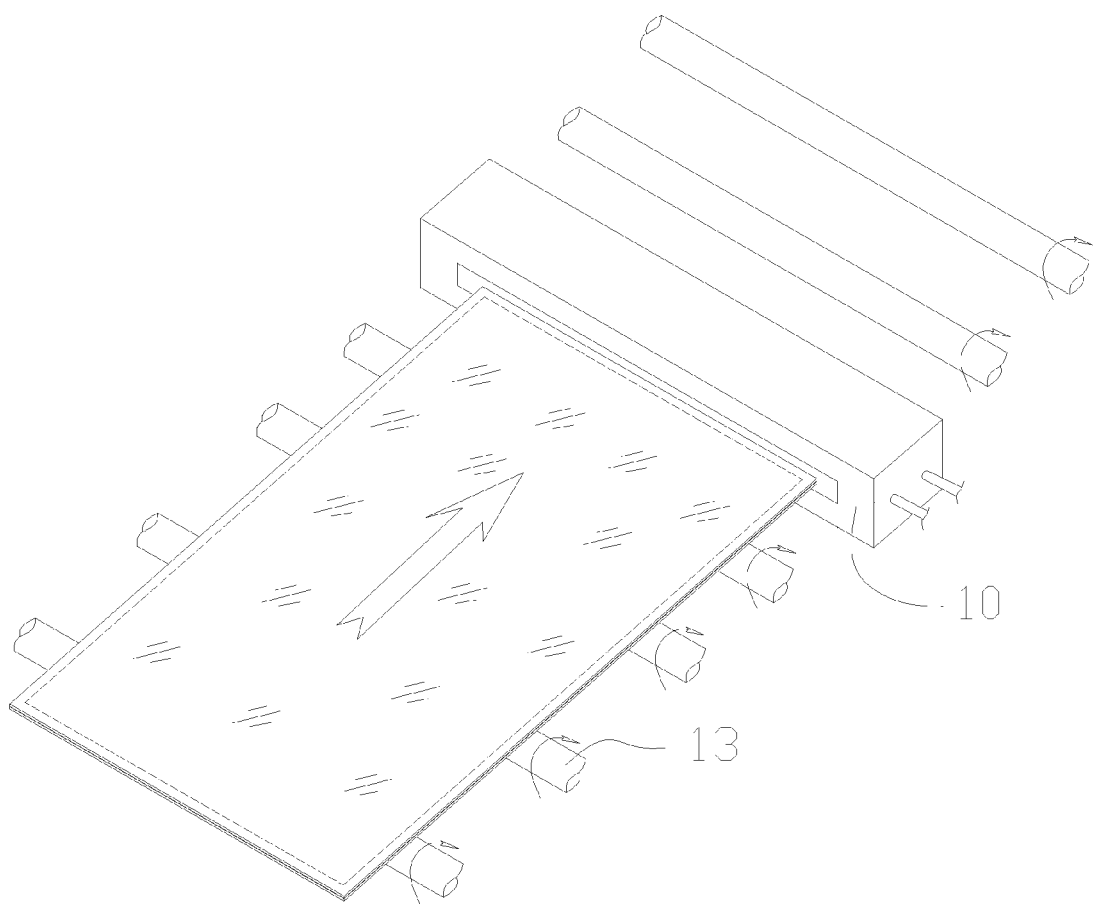
FIG. 6 is a schematic diagram of the usage state of the sealing device according to the present invention.

Shown as FIG. 6, the sealing device 10 according to the invention, when used, is arranged between glass conveyor rollers 13, and the position of the slot 11 thereon is matched with a supporting face of the rollers 13 in order to guarantee that the glass sheets conveyed on the rollers pass through the slot. In order to guarantee that the roller table at the upstream and downstream of the slot 11 can convey the glass sheets reliably and successively, the rollers at both sides of the slot 11 should be arrayed close to the slot 11 as much as possible as the glass sheets are supported on the rollers 13.

Figure 1:
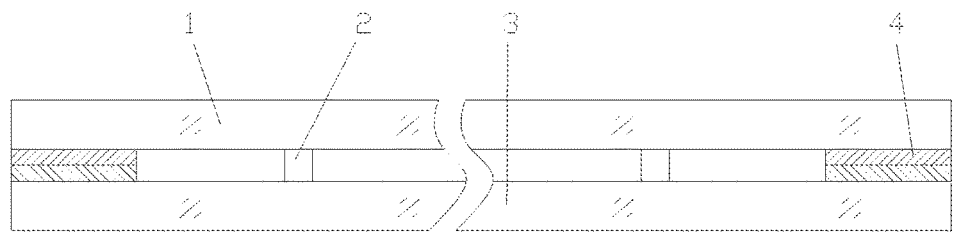
FIG. 1 is a schematic diagram of the vacuum glass in the first structural form.
Figure 2:
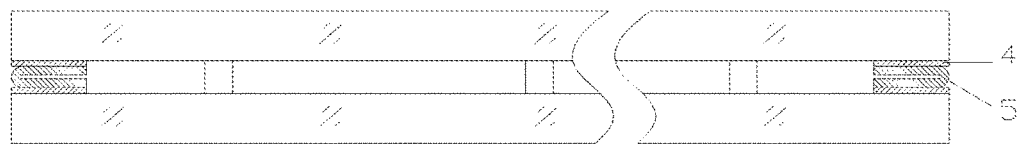
FIG. 2 is a schematic diagram of the vacuum glass in the second structural form.

In case that the slot-type vacuum glass sealing device 10 according to the invention is used for processing vacuum glass, first of all, glass sheets, which are fixedly bonded with two or a plurality of metal layers 4 at the circumferences thereof, are compounded according to the states shown as FIG. 1 or 2, and metal brazing material is arranged between the metal layers 4, corresponding to each other, on the two adjacent glass sheets, or between the metal layers 4 and a metal sealing piece 5; afterwards, the sealing device 10 is started up, and shown as the FIG. 6, the compounded glass sheet to be sealed is conveyed via the conveyor rollers 13 to pass through the slot 11; and as the glass sheet to be sealed passes through the slot 11, the metal brazing material arranged at the portion to be sealed, at the circumference of the glass sheet is molten by means of heating via the inductive heating coil, and two metal layers 4, corresponding to each other, are connected with each other in a manner of hermetical welding, or the metal layers 4 are connected with the metal sealing piece 5 in a manner of hermetical welding, thus the hermetical sealing of the circumference of the glass sheet is completed.

Figure 3:
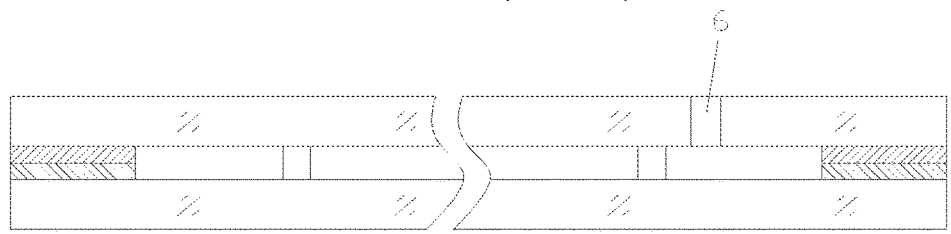
FIG. 3 is a schematic diagram of the vacuum glass in the third structural form.
Figure 4:
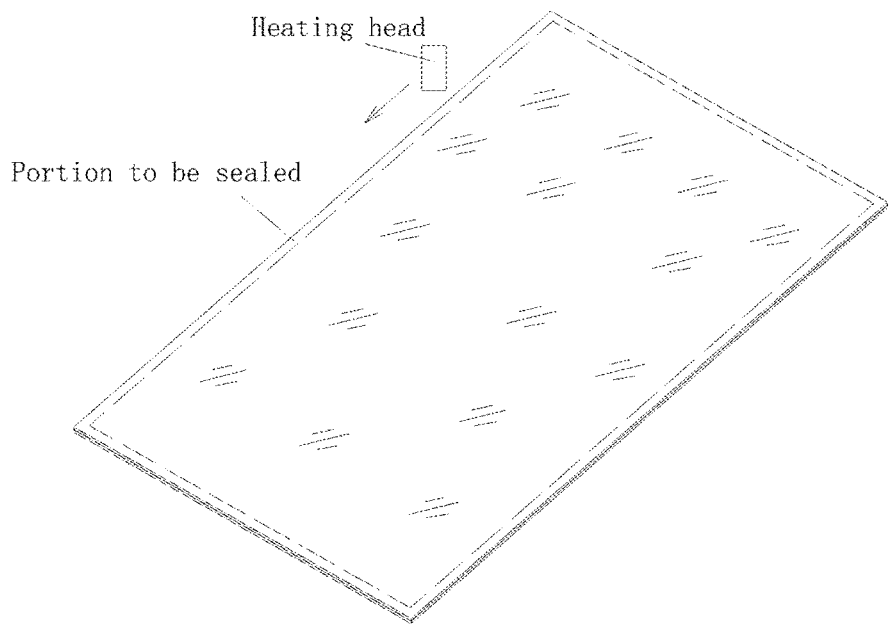
FIG. 4 is a schematic diagram of the previous sealing process of the circumference of vacuum glass.

Since being used for sealing the circumference of the glass sheet only, the sealing device according to the present invention is required to be arranged in a vacuum chamber in case of processing the vacuum glass shown as FIG. 1 or 2; and the sealing device according to the present invention is arranged in an open space in case of processing the vacuum glass shown as the FIG. 3.

Figure 7:
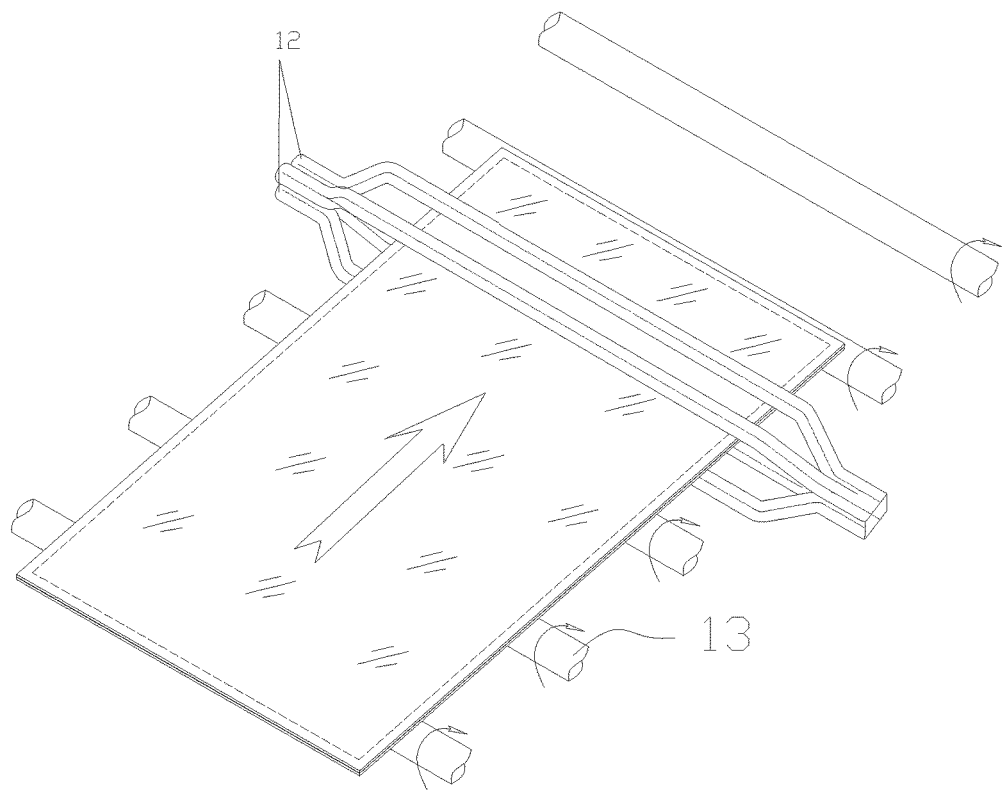
FIG. 7 is a schematic diagram of the layout of the high frequency inductive coil in the sealing device according to the present invention.

The high frequency inductive heating coil, the layout of which is shown as FIG. 7, is adopted in the sealing device.

In addition, in order to guarantee that the portion to be sealed at the circumference of the glass sheet is in reliable welding connection as the glass sheet passes through the slot 11, the press rollers or press wheels for the glass sheet can be arranged inside the slot 11 without having an influence on the normal heating of the inductive heating coil to the portion to be sealed on the glass sheet.

Figure 8A:
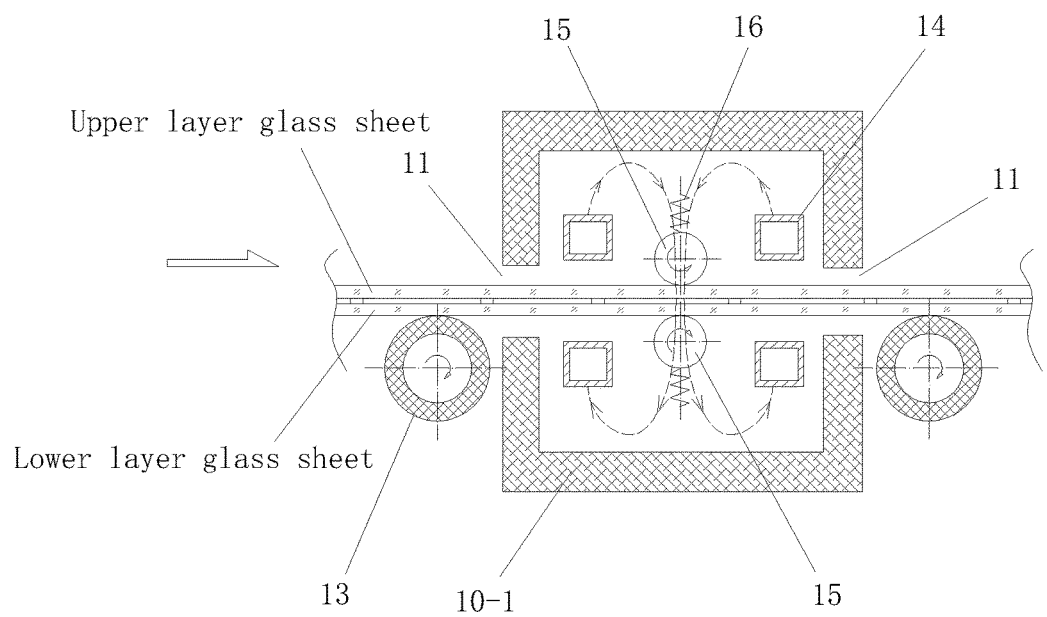
FIG. 8(a) is a schematic diagram of the sealing device according to the present invention with the slot thereof being provided with the press rollers or press wheels.

FIG. 8(a) is the schematic diagram showing the first arrangement manner of the press rollers or press wheels 15 inside the slot 11, 10-1 in the figure represents the casing of the sealing device, 14 represents the high frequency inductive heating coils arranged around the slot 11, 15 represents the press rollers or press wheels, and 16 represents jack-pressing springs.

Shown as the Figure, the press rollers or press wheels 15 are arranged between the high frequency inductive heating coils. During the operation, the press rollers or press wheels enter the slot 11 along with the upper and lower layer glass sheets compounded mutually, and the two glass sheets simultaneously enter the space between the upper and lower press rollers or press wheels and are mutually compressed so as to be in welding connection with each other under the compression state, thereby guaranteeing that the circumferences of the two glass sheets are reliably and hermetically interconnected.

Figure 8B:
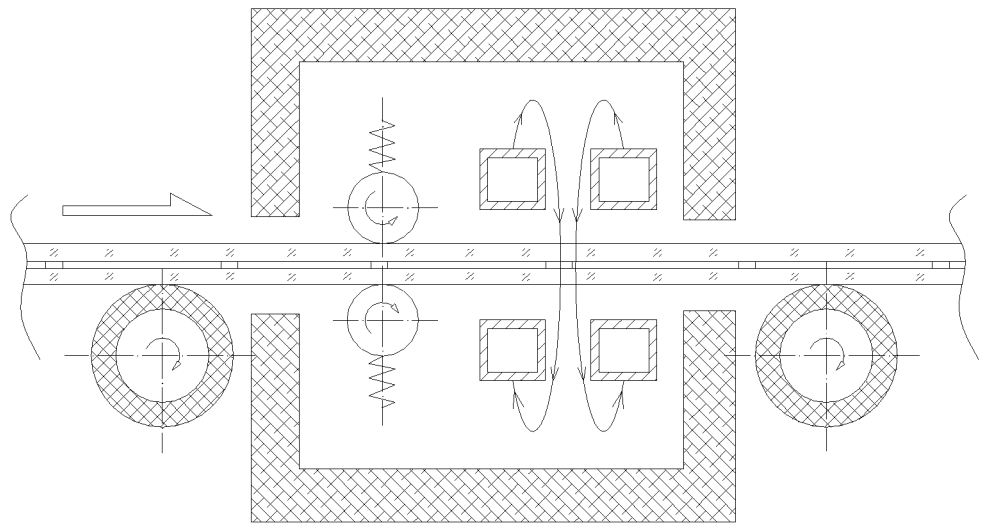
FIG. 8(b) is a schematic diagram of the press rollers or press wheels in the second arrangement form according to the present invention.
Figure 8C:
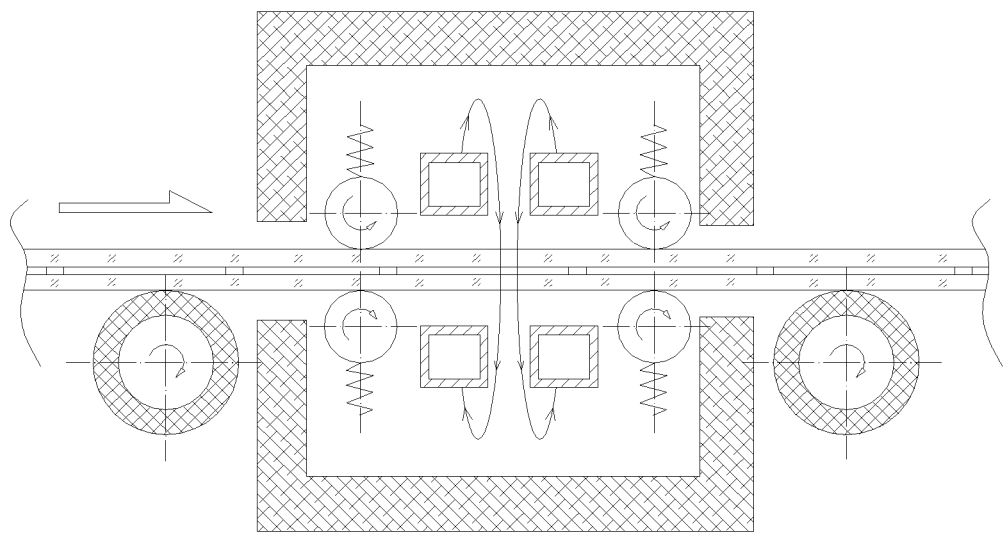
FIG. 8(c) is a schematic diagram of the press rollers or press wheels in the third arrangement form according to the present invention.

Besides the position between the inductive heating coils, shown as FIG. 8(a), the press rollers or press wheels can also be arranged at one side of the inductive heating coils, shown as FIG. 8(b), and both sides of the inductive heating coils, shown as FIG. 8(c).

The examples described above are merely description of the present invention. Embodiments of the invention shall not be limited to the examples described here, and various embodiments, conforming to the concept of the invention, from the skilled in this art, shall all fall in the protection scope of the invention.

The invention claimed is:

1. A slot-type vacuum glass sealing device comprising:
    an inductive heating device;
        conveyor rollers; and
        wherein the inductive heating device is arranged between the conveyor rollers and wherein a glass sheet to be sealed is conveyed by the conveyor rollers and passes through the inductive heating device; and
        wherein the inductive heating device comprises an elongated casing having a rectangular slot extending from a front side of the casing to a back side of the casing, and inductive heating coils arranged around the slot inside the casing, and wherein the glass sheet to be sealed enters the front side of the casing, passes through the slot and exits from the back side of the casing and the entire circumference of the entire glass sheet is gradually hermetically sealed through a metal brazing process in one pass as the glass sheet passes through the slot without changing travel direction;
        wherein the position of the slot is matched with a supporting face of the conveyor rollers and wherein conveyor rollers at the front side of the casing and the back side of the casing are arranged close to the slot;

wherein the glass sheet to be sealed comprises two or a plurality of glass sheets, and the circumference of the glass sheet is provided with a metal layer which is fixedly bonded therewith;

wherein the hermetical sealing means that the metal layers, corresponding to each other, at the circumferences of two adjacent glass sheets are directly interconnected in a manner of hermetical welding, or a metal sealing piece is arranged between the metal layers, corresponding to each other, at the circumferences of two adjacent glass sheets, and the metal sealing piece is respectively connected with the metal layers on the two glass sheets in a manner of hermetical welding.

2. The slot-type vacuum glass sealing device according to claim 1, wherein press rollers or press wheels are further arranged inside the casing between the inductive heating coils, and by taking advantage of the press rollers or press wheels, the glass sheets pass through the slot under the state of mutual compression in order to guarantee that the circumferences of the glass sheets are in reliable welding connection.

3. The slot-type vacuum glass sealing device according to claim 1, wherein press rollers or press wheels are further arranged inside the casing at one side of the inductive heating coils.

4. The slot-type vacuum glass sealing device according to claim 1, wherein press rollers or press wheels are further arranged inside the casing at both sides of the inductive heating coils.

* * * * *